US 8,738,887 B2

(12) United States Patent
Thoppaswamy et al.

(10) Patent No.: US 8,738,887 B2
(45) Date of Patent: May 27, 2014

(54) DYNAMIC FIX-UP OF GLOBAL VARIABLES DURING SYSTEM BIOS EXECUTION

(75) Inventors: Balakrishnan Thoppaswamy, Santa Clara, CA (US); Chang-Hwa Lee, Cupertino, CA (US); Eddie Howard, Crystal Springs, MS (US); Eric Lee, San Jose, CA (US); Feng Ding, Sunnyvale, CA (US); Simon Lian, San Jose, CA (US); Vinod Jani, San Jose, CA (US); Yevgen Goryachok, Cupertino, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 400 days.

(21) Appl. No.: 12/108,956

(22) Filed: Apr. 24, 2008

(65) Prior Publication Data

US 2009/0271560 A1 Oct. 29, 2009

(51) Int. Cl.
*G06F 9/35* (2006.01)
(52) U.S. Cl.
USPC ........... 711/202; 711/103; 717/118; 717/139; 717/140
(58) Field of Classification Search
USPC ............... 711/103, 202; 717/118, 139, 140
See application file for complete search history.

(56) References Cited

U.S. PATENT DOCUMENTS

| 5,473,775 | A | * | 12/1995 | Sakai et al. | 713/2 |
| 5,504,901 | A | * | 4/1996 | Peterson | 717/144 |
| 5,797,014 | A | * | 8/1998 | Gheith | 717/163 |
| 5,911,147 | A | * | 6/1999 | Onodera et al. | 711/5 |
| 7,007,159 | B2 | * | 2/2006 | Wyatt | 713/1 |
| 7,120,730 | B2 | * | 10/2006 | Maleug et al. | 711/103 |
| 7,472,380 | B1 | * | 12/2008 | Rao et al. | 717/140 |
| 7,512,699 | B2 | * | 3/2009 | Gowen et al. | 709/231 |
| 8,126,957 | B2 | * | 2/2012 | Gowen et al. | 709/202 |

OTHER PUBLICATIONS

University of New South Wales. "An Introduction to the GNU Assembler". Archive.org date of Oct. 10, 2003. http://www.cse.unsw.edu.au/~cs3221/labs/assembler-intro.pdf.*
The Ganssle Group. Writing Relocatable Code. Published in Embedded Systems Programming. Feb. 1992. http://www.ganssle.com/articles/arelocat.htm.*
Levine, John. Linkers and Loaders. Jun. 15, 1999. Archive.org date: Aug. 23, 2000. http://www.iecc.com/linker/linker08.html.*
Garbert et al. Gentoo Position Independent Code internals. Feb. 14, 2004. Archive.org date: Oct. 10, 2004. http://www.gentoo.org/proj/en/hardened/pic-internals.xml?style=printable.*

* cited by examiner

*Primary Examiner* — Arpan P. Savla
*Assistant Examiner* — Samuel Dillon
(74) *Attorney, Agent, or Firm* — Volpe and Koenig, P.C.

(57) ABSTRACT

A method is described for preserving the flexibility associated with relative memory addressing in programs designed to be stored in read-only memory.

14 Claims, 5 Drawing Sheets

DYNAMIC FIX-UP OF GLOBAL VARIABLES DURING SYSTEM BIOS EXECUTION

TECHNICAL FIELD

The disclosure is generally related to the Basic Input/Output System (BIOS) in personal computers.

BACKGROUND

The Basic Input/Output System (BIOS) is firmware code that starts the process of booting a personal computer (PC) when it is switched on. BIOS initializes basic components of the computer such as clocks, processors, chipsets, and memory before loading and transferring control to the operating system. BIOS is usually stored in read-only memory (ROM), electrically erasable, programmable read-only memory (EEPROM), or flash memory.

BIOS must be customized to work with each type of PC motherboard and chipset. Most PC motherboard manufacturers license a BIOS core and toolkit from an independent BIOS vendor. Makers of chipsets supply code modules that may be inserted in BIOS to adapt it for each chipset. The motherboard manufacturer uses the toolkit and the code modules to customize the BIOS for a specific hardware configuration.

Clearly a large number of potential combinations of processors, chipsets and motherboards exists. Customizing BIOS for each combination is a time consuming task. What is needed are methods to make this process as efficient as possible for manufacturers of chipsets, motherboards and BIOS.

BRIEF DESCRIPTION OF THE DRAWINGS

The drawings are heuristic for clarity.

DETAILED DESCRIPTION

Creating BIOS for a particular motherboard and chipset involves customizing BIOS code and data before storing it in a non-volatile memory chip such as ROM, EEPROM or flash. Once a BIOS chip is programmed its contents are not easily changed and this adds complication to the process of integrating code modules into BIOS. Often code may be loaded into computer-readable media for access by the computer system. Computer-readable media, including ROM, EEPROM, RAM and flash, for example, may be an information storage device that is easily read by an electronic device.

Disclosed herein is a method that permits greater flexibility in the design of code modules that are inserted in BIOS before the BIOS is written to a non-volatile memory chip. An understanding of the method is aided by a brief review of how programs in a computer access data.

Like other computer programs BIOS is executed by a microprocessor. BIOS contains code, or instructions for the microprocessor, and data to which the instructions are to be applied. For example, to make a microprocessor add two numbers it must be given both an instruction to add and also the two numbers (i.e. the data) to be added. Now consider in more detail how code and data are handled in a standard executable file, such as program for word processing or browsing the internet.

Figure 1:
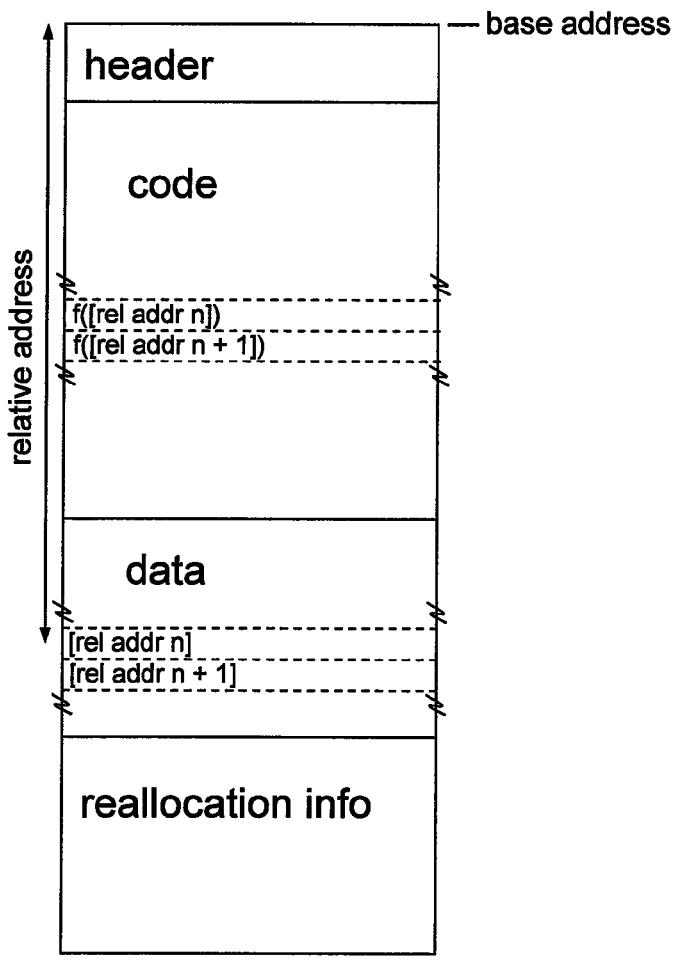
FIG. 1 shows a memory map for an executable file.

FIG. 1 shows a memory map for an executable file. The figure presents a schematic representation of how various elements of the file are organized in memory. The file comprises four sections: header, code, data and reallocation info. The file is loaded in to random access memory (RAM) beginning at a base address. Bytes of information in the file occupy memory addresses starting at the base address. The base address may be different each time the file is loaded into memory (e.g. each time a program is run).

The code section of the file contains microprocessor instructions. Some of the instructions contain references to memory addresses in the data section of the file. For example, an instruction in the code section might be to get a number stored in a certain memory address in the data section and load the number into a microprocessor register. In general, an instruction in the code section that accesses memory may be thought of as a function of a certain memory address, f (address). Because the base address is unknown before the program is run, references to memory are written in terms of relative addresses. A relative address may be expressed as the number of bytes from the base address to the memory byte in question. Therefore, to be more precise, instructions in the code section may be thought of as functions of relative addresses, f (relative address). In FIG. 1, f ([rel addr n]) and f ([rel addr n+1]) represent functions of relative memory addresses n and n+1 respectively. In particular f ([rel addr n]) tells the microprocessor to do something with the information stored in the memory location n bytes away from the base address.

Microprocessors, however, operate on absolute memory addresses; i.e. memory addresses enumerated from the beginning of the physical memory available in the computer system. Therefore, each time the executable file is loaded into RAM, a program called a loader changes relative addresses in the file to absolute addresses. The process is enabled by the reallocation info section of the file. The reallocation info tells the loader where to find each reference to a relative memory address in the code section of the program. The loader uses the base address and the relative addresses to calculate absolute addresses. The relative addresses are rewritten in memory as absolute addresses quite quickly as it is easy to change information that is stored in RAM.

Figure 2:
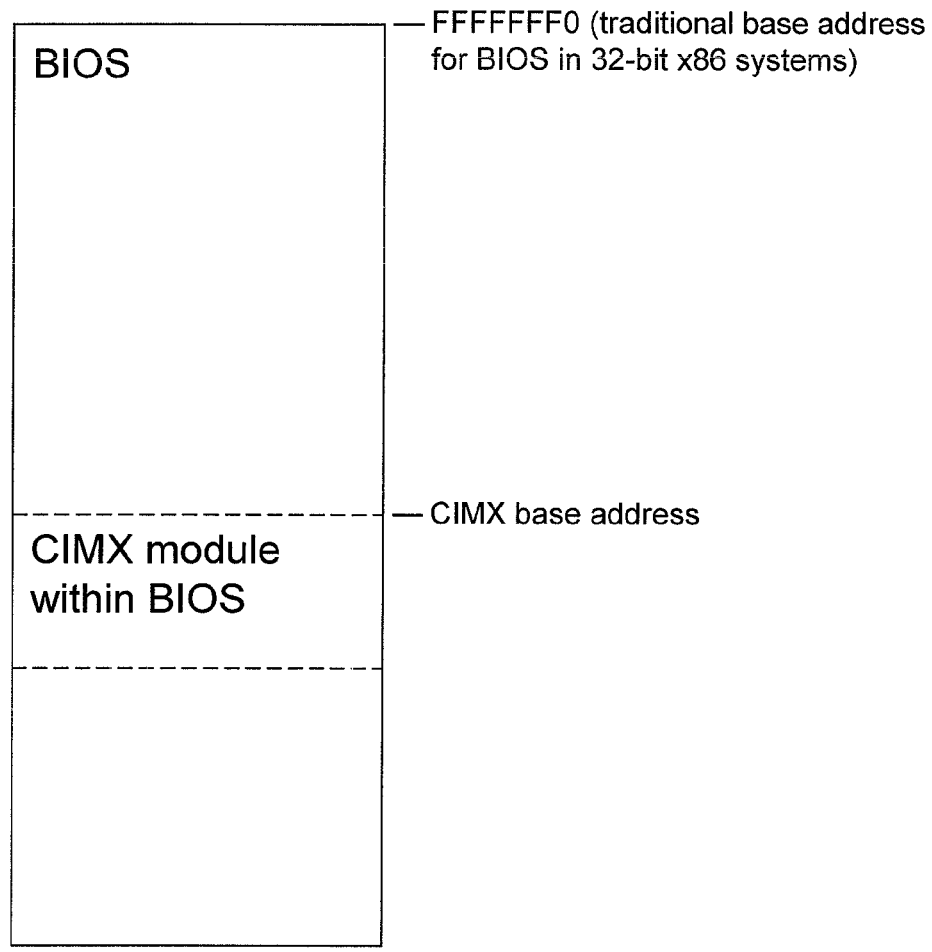
FIG. 2 shows a memory map for a module within BIOS.

FIG. 2 shows a memory map for a module within BIOS. A key difference between BIOS and other executable files is that BIOS is permanently located in ROM (or EEPROM or flash) starting at a fixed base address. For example, in 32-bit x86 computers, BIOS traditionally starts at absolute address FFFFFFF0 (16 bits less than 4 GB, the maximum address accessible with 32 bits). When an x86 microprocessor is first switched on it starts by executing whatever instruction is found at FFFFFFF0.

In FIG. 2 a chipset integration module (CIMX) is shown located within BIOS starting at the CIMX base address. The CIMX is a program that forms a subset of the BIOS. Its function is to customize the BIOS for a particular chipset. Like other types of executable files it contains code and data. It does not contain reallocation information however. Such information would be useless since it is not possible to rewrite information in BIOS as BIOS is stored in ROM.

Figure 3:
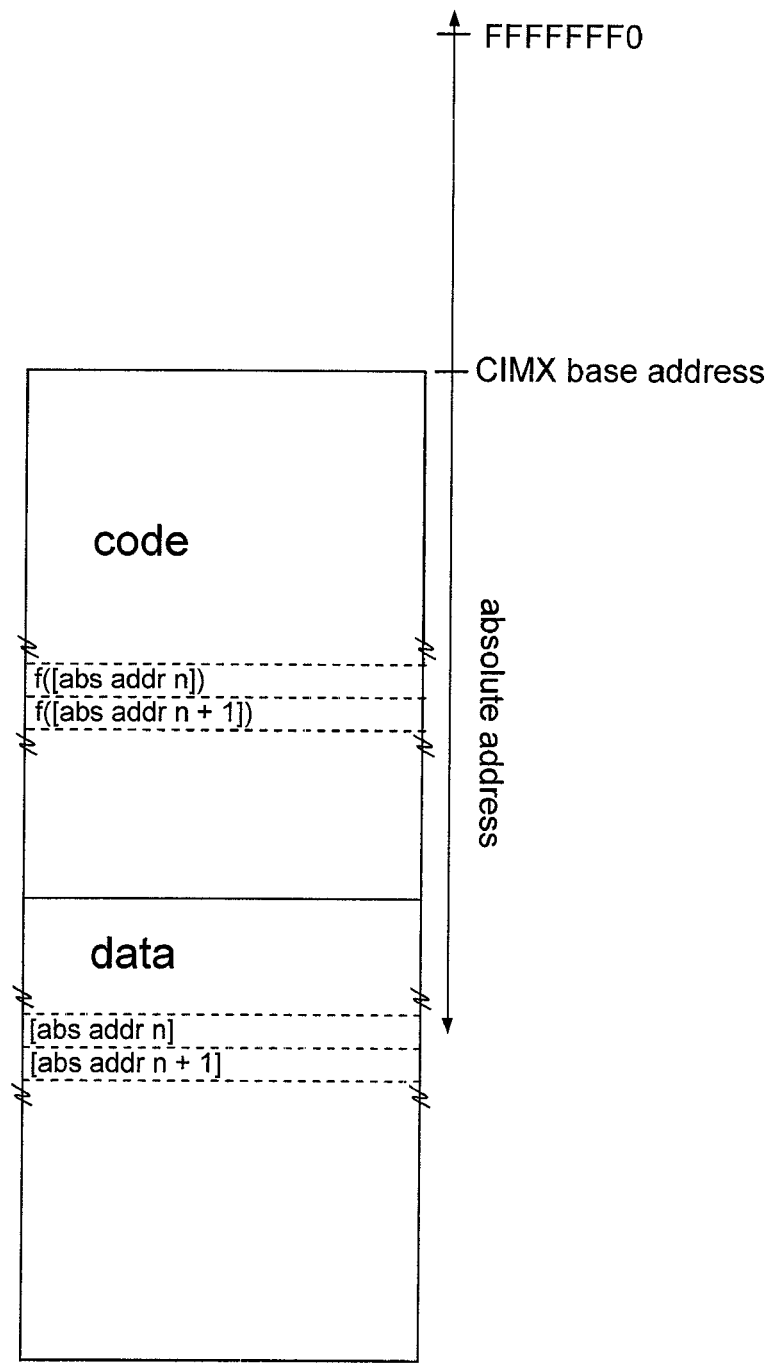
FIG. 3 shows details of a memory map for a module within BIOS.

FIG. 3 shows details of a memory map for a module within BIOS In FIG. 3 the code and data sections of a CIMX within BIOS are illustrated in more detail than in FIG. 2. Instructions in the code section may be thought of as functions of absolute addresses, f (absolute address). In FIG. 3, f ([abs addr n]) and f ([abs addr n+1]) represent functions of absolute memory addresses n and n+1 respectively. In particular f ([abs addr n]) tells the microprocessor to do something with the information stored in the memory location n bytes away from the BIOS base address FFFFFFF0.

It is possible to make chipset integration modules according to the scheme illustrated in FIG. 3; i.e. referring to absolute addresses in code. However, it is often inconvenient. CIMX is written by engineers at the chipset manufacturer while BIOS is written by an independent BIOS vendor. The motherboard is manufactured by a third company that must adapt BIOS to work with its board and with various chipsets. Furthermore CIMX is supplied as machine code, not open source. It is cumbersome for the motherboard company to have to tell the chipset manufacturer where the CIMX base address will be before the final BIOS is assembled. The problem is compounded because manufacturers of other components besides the chipset supply the motherboard company with their own modules for inclusion in the BIOS. Whenever one company's module is changed it is likely to change size (i.e. use a different amount of memory). This means that the base addresses of each module might have to be modified whenever any change is made to one module.

Figure 4:
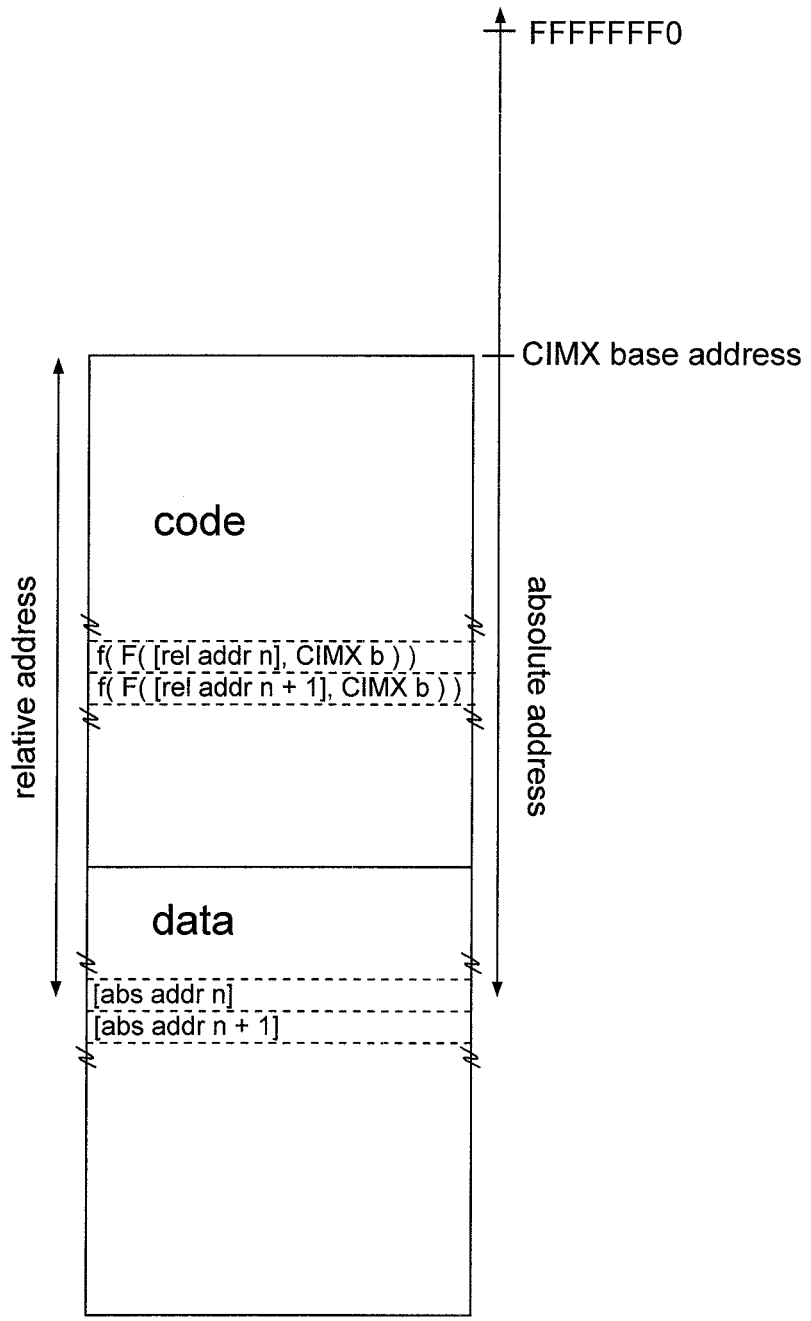
FIG. 4 shows details of a memory map for a module within BIOS.

FIG. 4 shows details of a memory map for a module within BIOS. The CIMX module of FIG. 4 is modified compared to that of FIG. 3 to make its integration into BIOS simpler. The code in FIG. 4 is written with an additional layer of logic that translates relative addresses into absolute addresses on the fly; i.e. when the program is running.

In FIG. 4 the code and data sections of a CIMX within BIOS are illustrated. Instructions in the code section may be thought of as functions of relative addresses and the CIMX base address, f (relative address, CIMX base address). In FIG. 4, f(F([rel addr n], CIMX b)) and f(F([rel addr n+1], CIMX b)) represent functions of relative memory addresses n and n+1 respectively. F([rel addr n], CIMX b) is a function that calculates the required absolute address given the relative address and the CIMX base address. In particular f(F([rel addr n], CIMX b)) tells the microprocessor to do something with the information stored in the memory location n bytes away from the CIMX base address. Function F(x) calculates the corresponding absolute address that the microprocessor requires. This is called dynamic fix-up of global variables.

This method of dynamically fixing up global variables (i.e. relative memory addresses) would not make sense for application programs loaded in RAM for it would make application programs run slowly. Applications access memory millions or even billions of times every time they run and the overhead associated with calculating an absolute address from a relative address each time would slow the program down. BIOS however, runs mainly at boot time and does not need to access data as often as a typical application. In fact the overhead from dynamic fix-up is negligible for BIOS.

Chipset integration modules using dynamic fix-up makes insertion of the modules in BIOS easy as the chipset manufacturer's engineers (and designers of other modules) no longer need to know where in BIOS their module will reside. The BIOS code passes the CIMX base address to the CIMX module when it is called in the core BIOS program.

Figure 5:
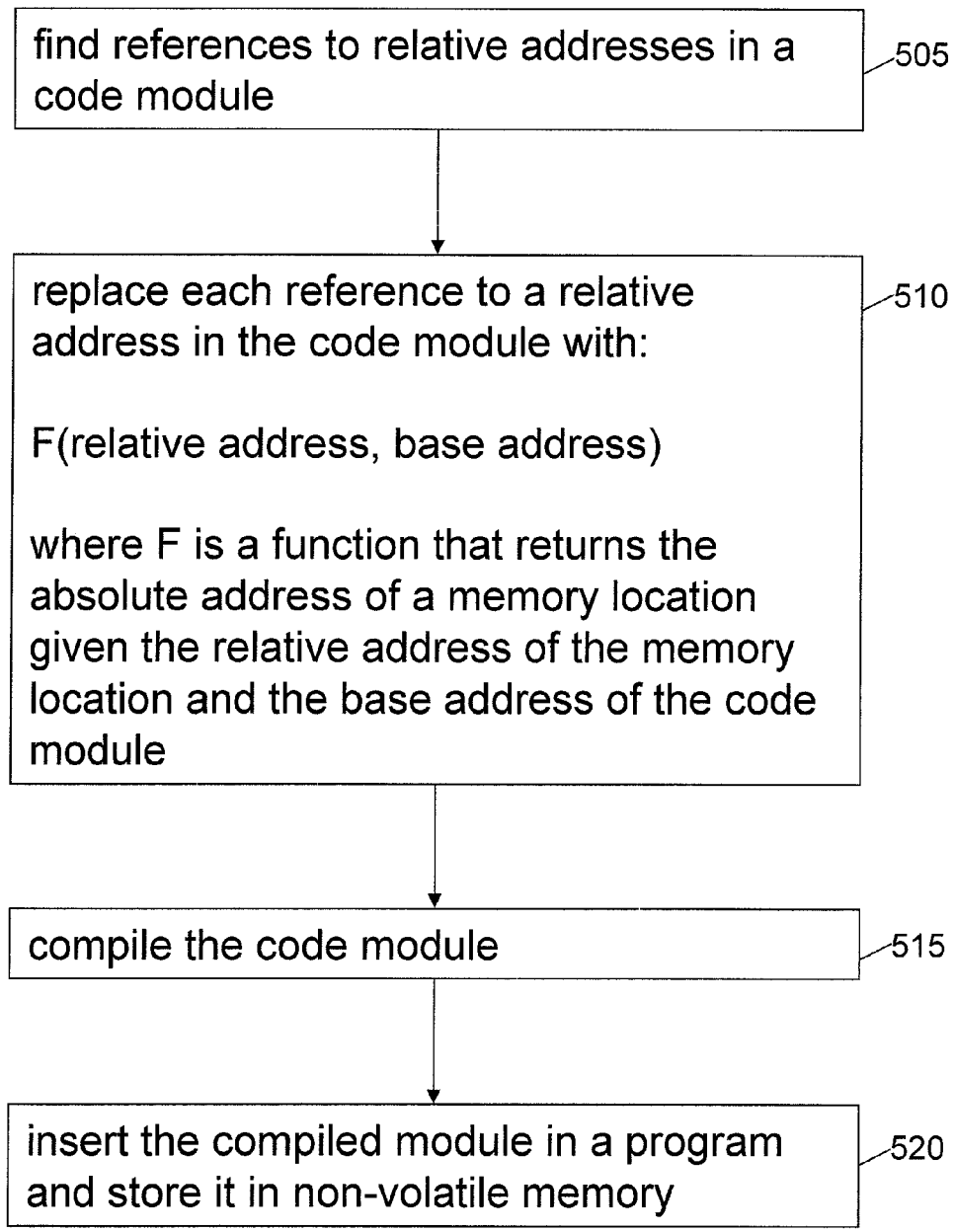
FIG. 5 outlines steps in a method to fix-up global variables in a program designed to be stored in read-only memory.

In conclusion, FIG. 5 outlines steps in a method to fix-up global variables in a program designed to be stored in read-only memory. The method may be implemented as a computer program for use by designers of code modules to be integrated in programs that are designed to be stored in non-volatile memory such as ROM. The first step 505 is to find references to relative addresses in a code module. Next 510 replace each reference to a relative address in the code module with: F(relative address, base address), where F is a function that returns the absolute address of a memory location given the relative address of the memory location and the base address of the code module. Then 515 compile the code module, and finally 520 insert the compiled module in a program and store it in non-volatile memory (e.g. ROM, EEPROM, flash, etc.).

Aspects of the invention described above may be implemented as functionality programmed into any of a variety of circuitry, including but not limited to electrically programmable logic and memory devices as well as application specific integrated circuits (ASICS) and fully custom integrated circuits. Some other possibilities for implementing aspects of the invention include: microcontrollers with memory (such as electronically erasable programmable read only memory (EEPROM)), embedded microprocessors, firmware, software, etc. Furthermore, aspects of the invention may be embodied in microprocessors having software-based circuit emulation, discrete logic (sequential and combinatorial), custom devices, and hybrids of any of the above device types. Of course the underlying device technologies may be provided in a variety of component types, e.g., metal-oxide semiconductor field-effect transistor (MOSFET) technologies like complementary metal-oxide semiconductor (CMOS), bipolar technologies like emitter-coupled logic (ECL), polymer technologies (e.g., silicon-conjugated polymer and metal-conjugated polymer-metal structures), mixed analog and digital, etc.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A method for customizing an initialization program for a chipset, comprising:
   generating a first module to be stored in non-volatile memory within the program as an executable file having a code section and a data section, wherein the executable file does not have a reallocation information section, comprising:
      finding references to relative memory addresses in the code section of the first module;

replacing each reference to a relative memory address with a function, F(relative address, base address), where F returns the absolute address of a memory location in the data section of the first module without reference to reallocation information, given the relative address of the memory location and a to-be-determined base address of the first module;

compiling the first module with the function for the replaced reference to a relative memory address pending determination of the base address; and inserting the compiled first module in the program;

customizing the program by adding at least another module as a separate and independent process from the generating of the first module; and storing the program in non-volatile memory;

wherein during execution of the program, the first module performs dynamic fix up of global variables.

2. The method of claim 1 wherein the first module is a chipset integration module and the program is a basic input/output system for a personal computer.

3. The method of claim 1 wherein the non-volatile memory is read-only memory.

4. The method of claim 1 wherein the non-volatile memory is electrically erasable programmable read-only memory or flash memory.

5. The method of claim 1, further comprising passing the base address to the first module when called in the program during execution.

6. The method of claim 1, wherein the program is a firmware code that performs initialization of basic components of a computer before loading and transferring control to an operating system.

7. A computer-readable non-volatile medium having instructions stored thereon of an initialization program customized for a chipset, that when executed cause a method to be performed for dynamic fix up of global variables in a first module stored as an executable file having a code section and a data section, wherein the executable file does not have a reallocation information section, comprising:

finding references to relative memory addresses in a code section of the first module;

replacing each reference to a relative memory address with a function, F(relative address, base address), where F returns the absolute address of a memory location in a data section of the first module without reference to reallocation information, given the relative address of the memory location and a to-be-determined base address of the first module;

compiling the first module with the function for the replaced reference to a relative memory address pending determination of the value of the base address;

wherein the compiled first module is inserted in the program and the program is customized for the chipset by including at least another module inserted separately and independently from the first module insertion in the program;

wherein during execution of the program, the first module performs dynamic fix up of global variables.

8. The computer-readable non-volatile medium of claim 7 wherein the first module is a chipset integration module and the program is a basic input/output system for a personal computer.

9. The computer-readable non-volatile medium of claim 7 wherein the non-volatile memory is read-only memory.

10. The computer-readable non-volatile medium of claim 7 wherein the non-volatile memory is electrically erasable programmable read-only memory or flash memory.

11. A non-volatile memory chip storing a basic input/output system customized for a microprocessor, chipset and motherboard, the system comprising one or more modules, each module having a code section and a data section, wherein a first module is generated with the code section containing executable instructions that include at least one function that dynamically translates a relative memory address of the code section into an absolute address of the data section that is calculated based on the relative address within the code section and a to-be-determined base address of the first module, the first module generated without reallocation information section;

wherein the first module is compiled with the function for the replaced reference to a relative memory address pending determination of the base address;

wherein the compiled first module is inserted in the basic input/output system;

wherein the basic input/output system is customized by adding the remaining modules as a separate and independent process from the generating of the first module; and wherein during execution of the basic input/output system, the first module performs dynamic fix up of global variables.

12. The non-volatile memory chip of claim 11 wherein the chip comprises read-only memory.

13. The non-volatile memory chip of claim 11 wherein the chip comprises electrically erasable programmable read-only memory or flash memory.

14. A non-volatile memory having stored therein a basic input/output system file having a first module customized for a chipset and motherboard, the first module comprising:

a code section, a data section, and absent of a reallocation information section;

a base address of a code section of the first module that is unknown and is an offset from a base address of the basic input/output system file;

a known relative address of the location of data within non-volatile memory; and a function, F(relative address, base address), for converting the known relative address to an absolute address in a data section of the first module once the base address is known, where F returns the absolute address of a memory location given the relative address and the base address;

wherein the first module is compiled, inserted into the basic input/output system and stored in the non-volatile memory with the base address unknown and in functional form for later determination upon execution of the basic input/output system and wherein the basic input/output system is further modified by inserting at least another module as a separate and independent process from the insertion of the first module; and wherein during execution of the basic input/output system, the first module performs dynamic fix up of global variables using only the code section and the data section of the first module.

* * * * *